(12) United States Patent
Smith

(10) Patent No.: US 8,345,692 B2
(45) Date of Patent: Jan. 1, 2013

(54) VIRTUAL SWITCHING OVERLAY FOR CLOUD COMPUTING

(75) Inventor: Michael Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 311 days.

(21) Appl. No.: 12/799,557

(22) Filed: Apr. 27, 2010

(65) Prior Publication Data

US 2011/0261828 A1    Oct. 27, 2011

(51) Int. Cl.
     *H04L 12/28*     (2006.01)
(52) U.S. Cl. .................................. 370/396; 370/401
(58) Field of Classification Search .................. 370/230, 370/351–356, 396–399, 400, 401, 409
See application file for complete search history.

(56) References Cited

U.S. PATENT DOCUMENTS

| | | | | |
|---|---|---|---|---|
| 6,490,273 | B1 * | 12/2002 | DeNap et al. ................. | 370/352 |
| 7,055,171 | B1 * | 5/2006 | Martin et al. ..................... | 726/3 |
| 7,516,211 | B1 | 4/2009 | Gourlay et al. | |
| 7,660,265 | B2 * | 2/2010 | Kreuk ............................ | 370/254 |
| 2003/0014524 | A1 | 1/2003 | Tormasov | |
| 2005/0063395 | A1 * | 3/2005 | Smith et al. .................... | 370/399 |
| 2006/0230407 | A1 | 10/2006 | Rosu et al. | |
| 2007/0028244 | A1 | 2/2007 | Landis et al. | |
| 2007/0147279 | A1 | 6/2007 | Smith et al. | |
| 2009/0063706 | A1 * | 3/2009 | Goldman et al. ............. | 709/250 |
| 2009/0249438 | A1 * | 10/2009 | Litvin et al. ...................... | 726/1 |
| 2009/0296726 | A1 * | 12/2009 | Snively et al. ................ | 370/401 |
| 2009/0327462 | A1 * | 12/2009 | Adams et al. ................. | 709/222 |
| 2010/0027420 | A1 * | 2/2010 | Smith .......................... | 370/235 |
| 2010/0131636 | A1 * | 5/2010 | Suri et al. ...................... | 709/224 |
| 2011/0090911 | A1 * | 4/2011 | Hao et al. ................. | 370/395.53 |
| 2011/0134793 | A1 * | 6/2011 | Elsen et al. .................... | 370/254 |
| 2011/0194404 | A1 * | 8/2011 | Kluger et al. ................. | 370/218 |

OTHER PUBLICATIONS

CohesiveFT:"VPN-Cubed IPsec to EC2 Free Edition v20090827",Aug. 28, 2009,XP000002657094, URL:http://www.cohesiveft.com/dnld/VPN-Cubed_IPsec_toEC2_Free_Edition_v20090827.pdf.
CohesiveFT:"VPN-Cubed SSL to Cloud (Free Edition) v20091207",Dec. 7, 2009,XP000002657095,URL: http://www.cohesiveft.com/dnld/VPN-Cubed_051_SSL-to-Cloud_Free-Edition_20091207.pdf.
"Cisco VN-Link:Virtualization-Aware Networking",Mar. 1, 2009,XP002597237, URLhttp://www.cisco.com/en/US/solutions/collateral/ns340/ns517/ns224/ns892/ns894/white_paper_c11-52530 7.pdf.
Cisco,"Virtual Networking Features of the VMWare vNetwork . . . ",Dec. 15, 2009, URL: http://www.cisco.com/en/US/prod/collateral/switches/ps9441/ps9902/solution_overview_c22-526262.pdf.
Wood T et al:"The case for enterprise-ready virtual private clouds",Jun. 19, 2009, pp. 1-5,XP002634215,URL:http://www.usenix.org/events/hotcloud09/tech/full_papers/wood.pdf.
http://aws.amazon.com/vpc.

* cited by examiner

*Primary Examiner* — Hong Cho
(74) *Attorney, Agent, or Firm* — Cindy Kaplan

(57) ABSTRACT

In one embodiment, a method includes receiving data at a virtual switch located at a network device in a cloud network. The data is received from an external network and destined for one or more virtual machines located in the cloud network and associated with the external network. The method further includes transmitting the data from the virtual switch to the virtual machines. The virtual switch operates as an access layer switch for the external network and creates a virtual switching overlay for secure communication between the virtual machines and the external network. Logic and an apparatus are also disclosed.

20 Claims, 6 Drawing Sheets

VIRTUAL SWITCHING OVERLAY FOR CLOUD COMPUTING

BACKGROUND

The present disclosure relates generally to communication networks, and more particularly, to cloud computing.

The number of applications and amount of data in enterprise data centers continue to grow. Cloud computing is being proposed as one possibility to meet the increasing demands. Cloud computing enables network access to a shared pool of configurable computing resources (e.g., networks, servers, storage, applications, and services) that can be rapidly provisioned and released with minimal management effort. Infrastructure as a Service (IaaS) is one area of cloud computing that has attracted a lot of interest. IaaS delivers computer infrastructure, typically a platform virtualization environment, as a service. Rather than purchasing servers, software, data center space, or network equipment, customers instead purchase these resources as an outsourced service. Most IaaS providers do not disclose how their infrastructures are handled internally since they often view this as their competitive advantage. As a result, the enterprise has no visibility into the infrastructure within the cloud and is left with no assurance of security, reliability, or visibility. Even if the provider discloses how their internal operations are implemented, there is still no way for the enterprise to monitor or verify the infrastructure.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
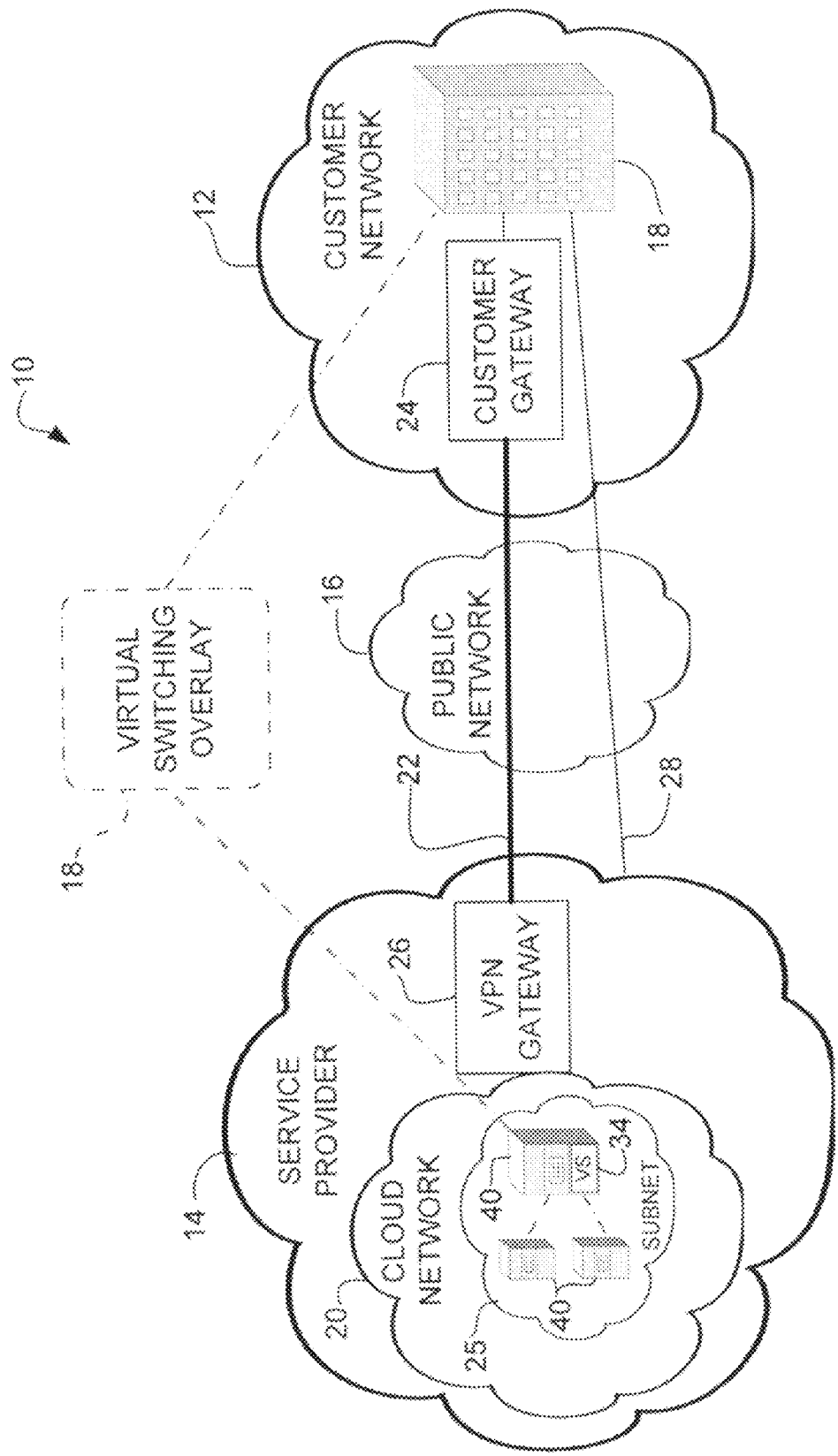
FIG. 1 illustrates an example of a network in which embodiments described herein may be implemented.

In one embodiment, a method generally comprises receiving data at a virtual switch located at a network device in a cloud network. The data is received from an external network and destined for one or more virtual machines located in the cloud network and associated with the external network. The method further includes transmitting the data from the virtual switch to the virtual machine. The virtual switch operates as an access layer switch for the external network and creates a virtual switching overlay for secure communication between the virtual machines and the external network.

In another embodiment, logic is encoded in one or more tangible media for execution and when executed operable to switch data between virtual machines located in a cloud network, forward data to an external network, perform access layer switch operations for the external network, and create a virtual switching overlay for secure communication between the virtual machines and the external network.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other applications without departing from the scope of the embodiments. Thus, the embodiments are not to be limited to the embodiments shown, but are to be accorded the widest scope consistent with the principles and features described herein. For purpose of clarity, features relating to technical material that is known in the technical fields related to the embodiments have not been described in detail.

Cloud computing is a model that provides resources and services that are abstracted from an underlying infrastructure and provided on demand and at scale in a multi-tenant environment. The clouds are typically accessed through web browsers or APIs (Application Programming Interfaces) and offer nearly unlimited capacity on demand, but with limited customer control. One area of cloud computing is Infrastructure as a service (IaaS), in which computing, network, and storage services are delivered over the network on a pay-as-you-go basis. A popular offering within IaaS is the Virtual Private Cloud (VPC). The VPC is hosted on a public cloud; therefore, it is not truly a private cloud. The VPC includes a set of Virtual Machines (VMs) and networks that are connected to the enterprise and appear to be part of the enterprise (i.e., associated with the enterprise network). With conventional implementations of virtual private clouds, there are concerns about security, reliability, and visibility. The network administrator has to extend the enterprise network into an insecure environment and therefore loses visibility into what is happening within the cloud, and control over security and enterprise-class features. Also, there is no consistent interface between all of the various cloud providers. Enterprises desire security, service-level guarantees, and compliance control, but with virtual private clouds, the service providers are in control of these requisite capabilities. These drawbacks prevent many enterprises from adopting cloud computing.

The embodiments described herein address the above needs within the cloud computing environment. The embodiments provide a virtual switching overlay on top of the cloud infrastructure. This allows the network administrator to regain control of the network access layer within the virtual private cloud and provides full visibility into the cloud, secure communication within the cloud and from the cloud to the enterprise, and an interface to the cloud network that is independent of the service provider.

Referring now to the drawings, and first to FIG. 1, an example of a network 10 that may implement embodiments described herein is shown. The embodiments operate in the context of a data communication network including multiple network elements. Some of the elements in a network that employs the system may be network devices such as servers, switches, routers, or gateways. The network device may include, for example, a master central processing unit (CPU), interfaces, and a bus. The CPU preferably includes memory and a processor. The network device may be implemented on a general purpose network machine such as described below with respect to FIG. 6. It is to be understood that the simplified network shown in FIG. 1 is only one example, and that the embodiments described herein may be employed in networks having different configurations and types of network devices.

The network 10 shown in FIG. 1 includes a customer network (e.g., enterprise network) 12 in communication with a service provider network 14 through a public network (e.g., Internet) 16. The customer network 12 includes a plurality of end users 18 at one or more locations. The service provider 14 includes a cloud network (e.g., virtual private cloud) 20, which is an isolated portion of the service provider network. The VPC 20 may include any number of subnets 25. The subnet 25 is a segment of the VPC's IP address range where the customer can place groups of isolated resources. The service provider network 14 may include any number of virtual private clouds 20 or subnets 25 associated with the customer network 12 or other customer networks. The customers are segmented within the virtual private cloud 20 by the service provider. The customer end users 18 communicate with the VPC 20 over a connection 22 (e.g., Virtual Private Network (VPN) connection) between a customer gateway 24 and VPN gateway 26. The connection 22 passes through the public network 16. The customer 18 may also communicate outside of the VPN connection 22 as shown at communication path 28. The customer network 12 is located outside of the VPC 20 and may be referred to as an external network as viewed from the VPC.

The VPC 20 includes a plurality of servers 40 which utilize virtualization technology. Virtualization allows one computer to do the job of multiple computers by sharing the resources of a single computer across multiple systems. Software is used to virtualize hardware resources of a computer, including, for example, the CPU, RAM, hard disk, and network controller, to create a virtual machine that can run its own operating system and applications. Multiple virtual machines on each server share hardware resources without interfering with each other so that several operating systems and applications can be run at the same time. The virtual machines are deployed within the cloud on demand with the IP addresses of the VMs controlled by the enterprise.

As described in detail below, a virtual switch 34 is located in the VPC 20 to provide a virtual switching overlay 18 on top of the cloud. The virtual switch 34 operates as an access layer switch for the customer so that the customer has control of the cloud network access layer.

Figure 2:
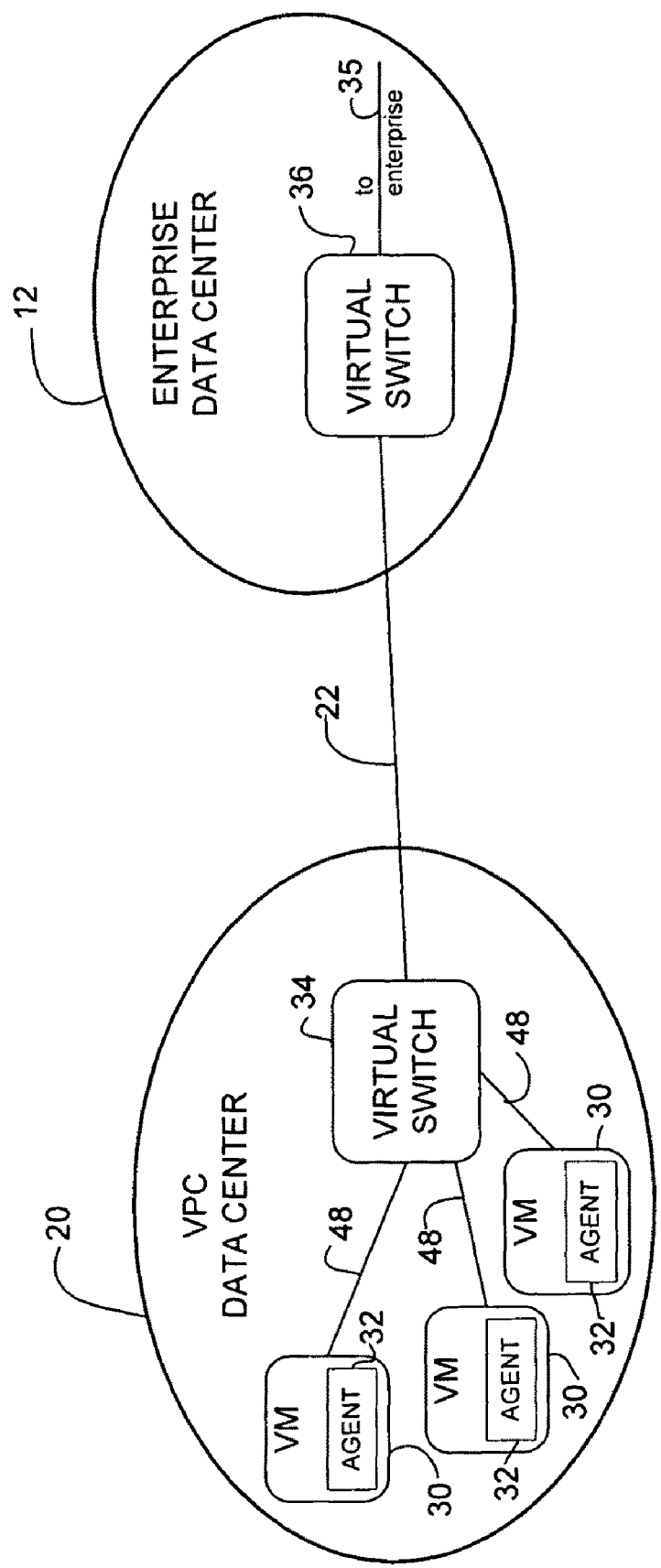
FIG. 2 is a diagram illustrating a virtual switch interconnecting an enterprise data center and a virtual private cloud data center in the network of FIG. 1, in accordance with one embodiment.

FIG. 2 illustrates the virtual switch 34 located in a VPC data center (cloud 20 in FIG. 1) and in communication with a virtual switch 36 located at an enterprise data center (customer network 12 in FIG. 1). The virtual switch 34 provides secure communication within the VPC data center 20 and to the enterprise data center 12. Secure tunnel communication between the virtual switch 34 and the enterprise network 12 may be in the form of L2TPv3 (Layer 2 Tunneling Protocol version 3) over IPsec (Internet Protocol Security) so that the default gateway is in the enterprise network. Layer 3 (L3) VPN communication may also be used between the enterprise 12 and the VPC 20. In this case, the virtual switch 34 operates as a default gateway at the VPC 20. It is to be understood that other protocols may also be used to securely transfer data between the virtual switch 34 and enterprise 12.

The virtual switch 34 transmits data received from the enterprise 12 to virtual machines 30 located within the VPC 20 via encrypted links (virtual secure wires) 48. The VPC data center 20 may also include more than one virtual switch 34 with an encrypted link between the virtual switches. L2TPv3 over IPsec may be used to encrypt packets transmitted between the virtual switch 34 and virtual machines 30. It is to be understood that L2TPv3 over IPsec is only one example and that other protocols may be used to transfer data between the virtual switch 34 and virtual machines 30.

In one embodiment, each virtual machine 30 includes an agent 32. The agent 32 may be a VPN client, for example, or other application loaded in the virtual machine 30 by an enterprise server/application administrator. The agent 32 contains the IP address assigned by the service provider and port profile names. A port profile is used to define a common set of configuration policies (attributes) for multiple interfaces. The port profiles are associated with port configuration policies defined by the network administrator and applied to a large number of ports as they come online in a virtual environment.

The VPN connection 22 may be used to signal VM MAC addresses back to the enterprise 12 to prevent flooding across the VPN connection 22. Since traffic leaving the virtual private cloud 20 is often billed by the provider, stopping floods can reduce costs. The virtual switch 36 at the enterprise may also proxy ARP (Address Resolution Protocol) requests on behalf of the VMs 30 within the VPC 20. As shown in FIG. 2, the enterprise virtual switch 36 also has an unencrypted interface at link 35 which connects to the rest of the enterprise network.

Figure 3:
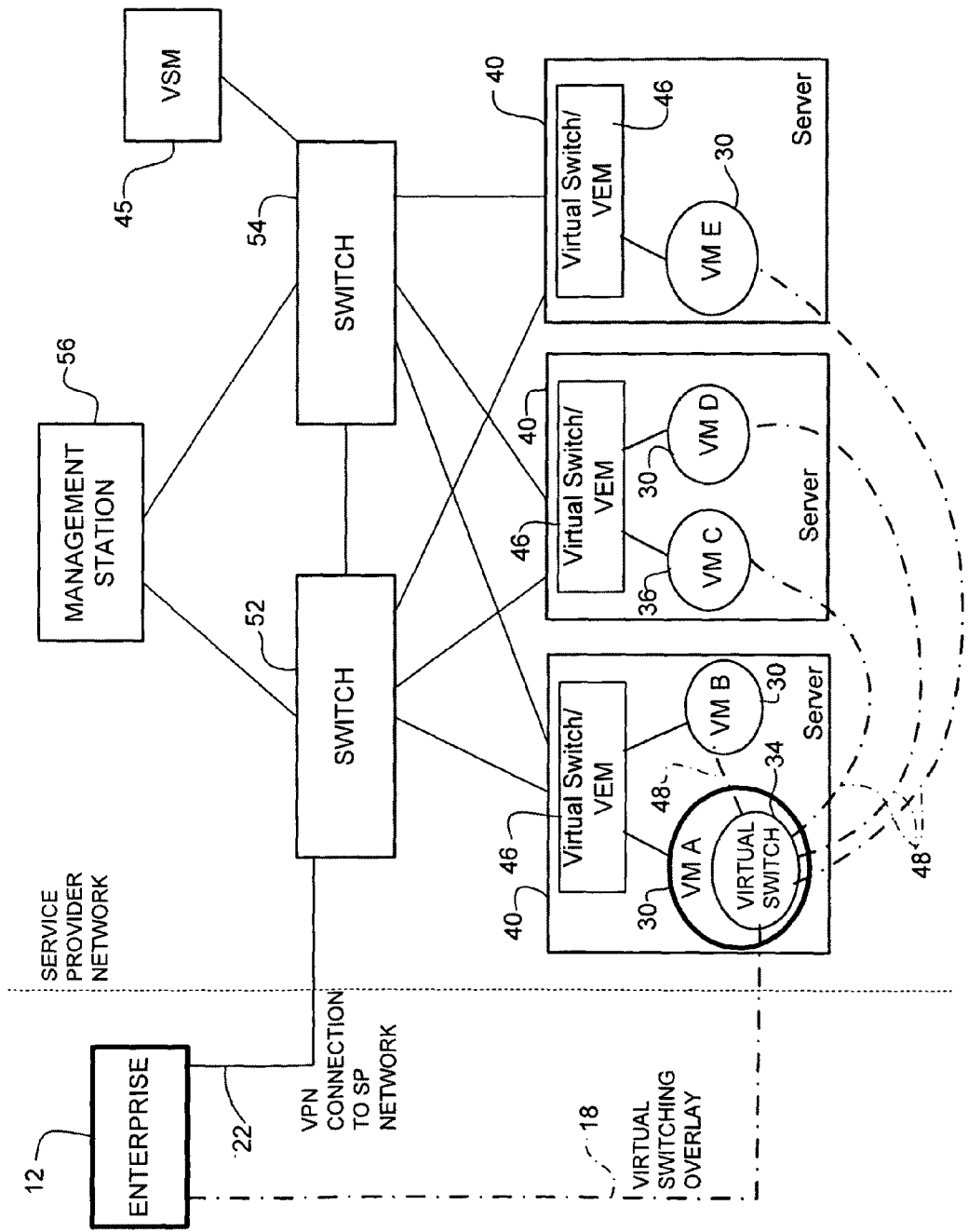
FIG. 3 is a diagram illustrating implementation of the virtual switch in the network of FIG. 1, in accordance with one embodiment.

FIG. 3 illustrates details of implementation of the virtual switch 34 in the network of FIG. 1, in accordance with one embodiment. The virtual switch 34 is located in one of the virtual machines 30. The servers 40 in the VPC 20 each include one or more virtual machines 30. In the example of FIG. 3, the virtual switch 34 is installed at VM A, which is located along with VM B at a first server. VM C and VM D are located at a second server, and VM E is located at a third server, each server being physically separate from the other servers. The virtual machines 30 may each be moved between servers 40 based on traffic patterns, hardware resources, or other criteria.

The servers 40 are in communication with the network via switches 52, 54, (e.g., hardware implemented network switches or other network devices configured to perform switching or routing functions). The switches 52, 54 may be in communication with a management station 56 (e.g., virtualization management platform such as VMware Virtual Center management station, available from VMware of Palo Alto, Calif.). The management station 56 or one or more management functions may also be integrated into the switches 52, 54.

In the embodiment shown in FIG. 3, the virtual machines 30 communicate with the network via a virtual switch (45, 46), such as NEXUS 1000V, available from Cisco Systems, Inc. of San Jose, Calif. The virtual switch is located in the service provider network 14 and includes components referred to as a Virtual Supervisor Module (VSM) 45 and Virtual Ethernet Module (VEM) 46. The VSM 45 may be located in a physical appliance (e.g., server) in communication with the servers 40 and management station 56 via physical switches 52, 54. The VSM 45 may also be a virtual appliance (e.g., virtual machine) installed at one of the servers 40 or the VSM may be installed at one of the switches 52, 54.

The VSM 45 is configured to provide control/management plane functionality for the virtual machines 30 and control multiple VEMs 46. The VEM 46 provides switching capability at the server 40 and operates as a data plane associated with the control plane of the VSM 45. The VSM 45 and VEM 46 operate together to form a distributed virtual switch as viewed by the management station 56. The VSM 45 and VEM 46 may also be located together in a network device (e.g., switch 52, 54, server 40 or other network device in communication with the switches 52, 54 and servers 40).

It is to be understood that the network shown in FIG. 3 is only one example, and that the virtual switching overlay 18 may be used in different networks having different network components. For example, the virtual switching overlay 18 may run on top of VMWare, Xen hypervisor or any other hypervisor or platform virtualization model at the VPC 20. Thus, the virtual switch (VSM 45/VEM 46) is just one example of a virtualization model at the service provider network.

Figure 4:
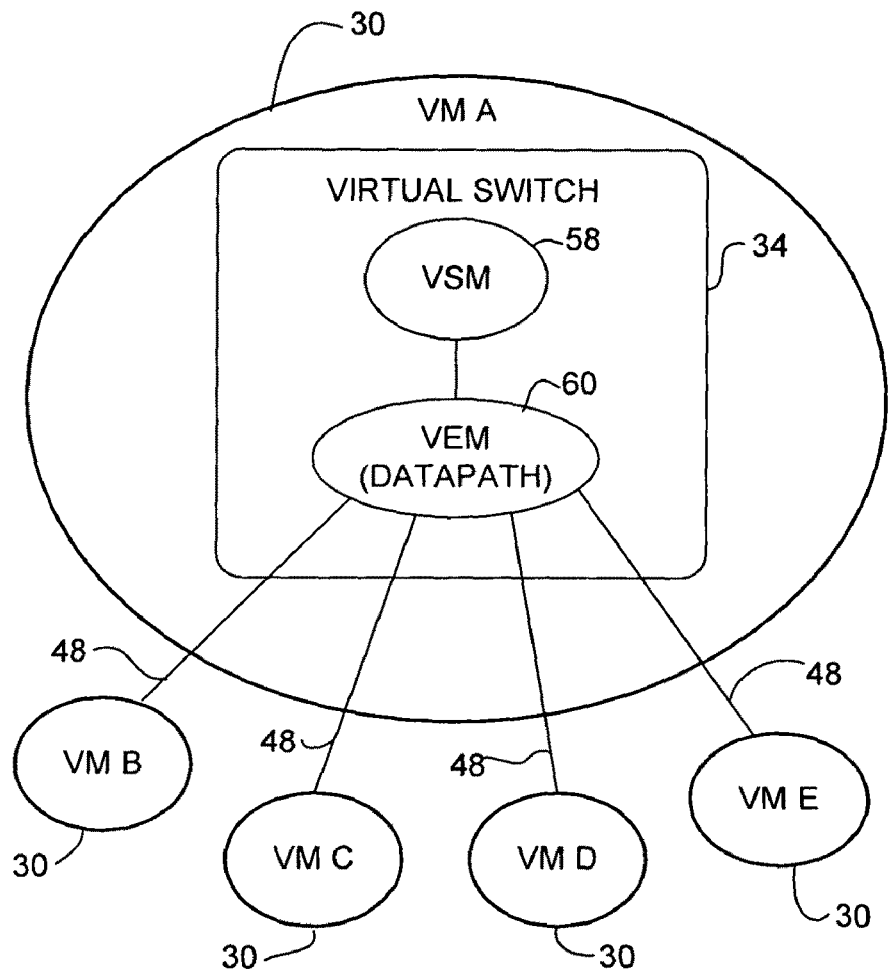
FIG. 4 is a diagram illustrating details of the virtual switch located in a virtual machine in the network of FIG. 3, in accordance with one embodiment.

FIG. 4 illustrates one example of the virtual switch 34 installed at VM A in FIG. 3. The virtual switch 34 switches traffic between the secure virtual wires 48 connecting the virtual switch to the virtual machines 30. The virtual wires 48 run from the virtual switch 34 to the agent 32 installed in the virtual machines 30 (FIGS. 2 and 4). In one embodiment, the virtual switch 34 includes a Virtual Supervisor Module (VSM) 58 and Virtual Ethernet Module (VEM) 60. As described above with respect to the service provider network in FIG. 3, the VSM 58 provides control plane functionality and the VEM 60 operates as a datapath associated with the control plane of the VSM. The VEM 60 supports a plurality (e.g., hundreds or thousands (or fewer or more)) of virtual Ethernet interfaces which communicate with the VMs 30. The virtual wire 48 establishes a secure tunnel using L2 over IPSec (or other protocol) to the VSM IP address at the virtual switch 34. For example, the virtual switch 34 may encapsulate packets with an L2TPv3 header before transmitting the packets over the wire 48.

The virtual switch 34 allows the enterprise to gain control of the cloud network access layer. All traffic entering or leaving the cloud (e.g., VPC 20 or subnet 25 in VPC) associated with the enterprise passes through the virtual switch 34. An administrator at the enterprise can access the virtual switch 34 and view the virtual Ethernet ports (interfaces), configure ACLs (Access Control Lists), manage port profiles, and perform other management functions typically performed at the access layer.

The VPC 20 may include multiple virtual switches 34 connected to a central management plane. The central management plane is assigned an elastic IP address and spawns off virtual switches 34 as virtual Ethernet interfaces are created and limits at the virtual switch are reached. The port profiles may be configured in the central management plane with the virtual switches 34 pulling port profiles on demand when the associated virtual Ethernet interfaces connect to the virtual switch. The virtual switches 34 preferably create a full mesh of VPN tunnels to form a single logical switch to prevent loops and eliminate the need for spanning tree.

Figure 5:
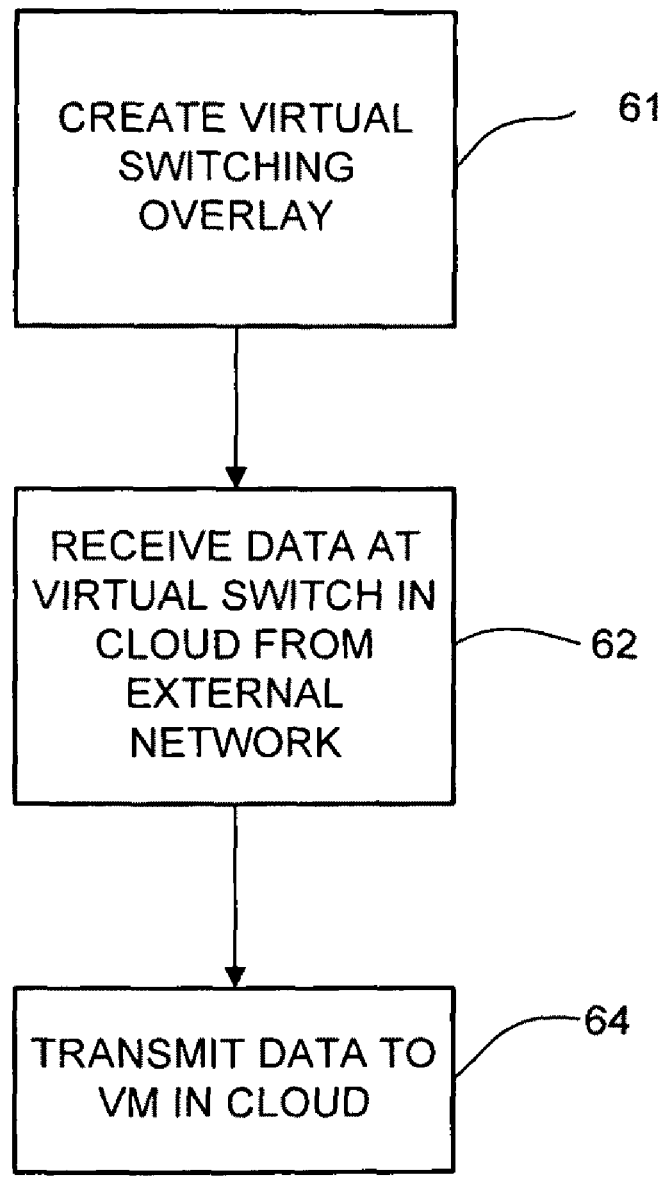
FIG. 5 is a flowchart illustrating an overview of a process for implementing a virtual switching overlay for cloud computing, in accordance with one embodiment.

FIG. 5 is a flowchart illustrating an overview of a process for implementing a virtual switching overlay for cloud computing, in accordance with one embodiment. At step 61, the virtual switching overlay 18 is created by installing the virtual switch 34 at a network device (e.g., server 40) in the cloud network 20. The virtual switch 34 operates as an access layer switch for an external network (e.g., customer network 12 located outside of the cloud network) and creates the virtual switching overlay 18 for secure communication between the virtual machines 30 and the external network 12. The virtual switch 34 receives data from the external network at step 62. The received data is destined for one or more of the virtual machines 30 located within the cloud network 20 and associated with the external network 12. The virtual switch 34 transmits the data to the virtual machine 30 over virtual wire 48 (step 64). The data may be, for example, a packet or frame containing a request for data stored at one of the servers 40 or an update to data stored at one or more of the servers.

Figure 6:
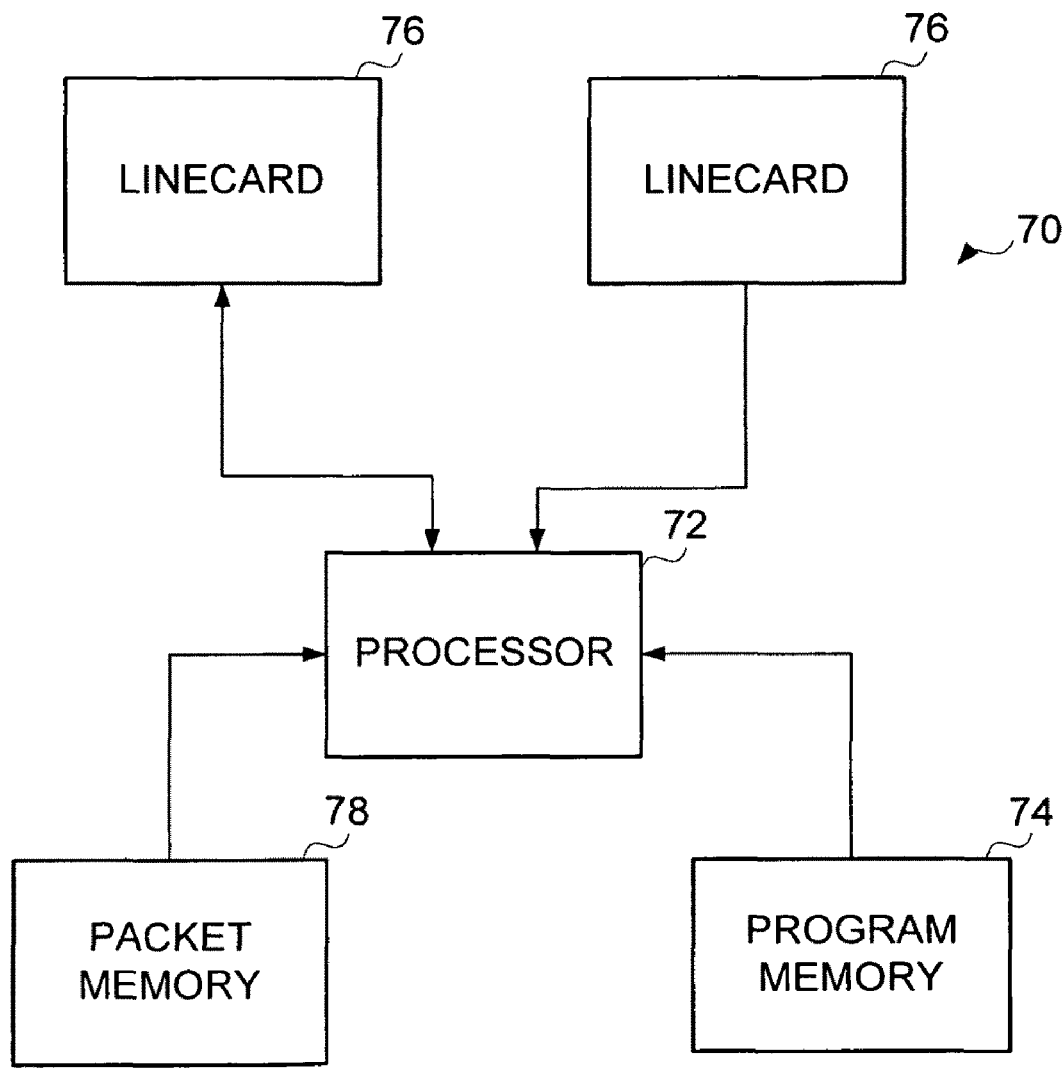
FIG. 6 depicts an example of a network device useful in implementing embodiments described herein.

FIG. 6 depicts a network device 70 that may be used to implement embodiments described herein. The network device 70 may be, for example, the server 40 containing the virtual switch 34. Network device 70 is configured to implement all of the network protocols and extensions thereof described herein. In one embodiment, network device 70 is a programmable machine that may be implemented in hardware, software, or any combination thereof. Logic may be encoded in one or more tangible media for execution by a processor 72. For example, processor 72 may execute codes stored in a program memory 74. Program memory 74 is one example of a computer-readable medium. Program memory 74 can be a volatile memory. Another form of computer-readable medium storing the same codes is a type of non-volatile storage such as floppy disks, CD-ROMs, DVD-ROMs, hard disks, flash memory, etc. The processor 72 includes means for transmitting, receiving, and encapsulating data and signaling addresses.

Network device 70 interfaces with physical media via a plurality of linecards (network interfaces) 76. Linecards 76 may incorporate Ethernet interfaces, DSL interfaces, Gigabit Ethernet interfaces, 10-Gigabit Ethernet interfaces, SONET interfaces, etc. As packets are received, processed, and forwarded by network device 70, they may be stored in a packet memory 78. To implement functionality according to the system, linecards 76 may incorporate processing and memory resources similar to those discussed above in connection with the network device as a whole. It is to be understood that the network device 70 shown in FIG. 6 and described above is only one example and that different configurations of network devices may be used.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving data at a virtual switch located at a network device in a cloud network, said data received from an external network and destined for one or more virtual machines located in the cloud network and associated with the external network; and
transmitting said data from the virtual switch to said one or more virtual machines;
wherein the virtual switch operates as an access layer switch for the external network and creates a virtual switching overlay for secure communication between the virtual machines and the external network.

2. The method of claim 1 wherein the external network is an enterprise network and the cloud network is a virtual private cloud in a service provider network.

3. The method of claim 1 wherein transmitting said data comprises encapsulating said data for transmittal over a layer 3 network.

4. The method of claim 1 wherein transmitting said data comprises transmitting said data over a virtual wire to an agent installed at one of the virtual machines.

5. The method of claim 1 wherein said data is received over a virtual private network connection between the cloud network and the external network.

6. The method of claim 1 wherein transmitting said data comprises utilizing a layer 2 tunneling protocol over a secure Internet protocol.

7. The method of claim 1 further comprising securely transmitting data received from one of the virtual machines to a virtual switch in the external network.

8. The method of claim 1 further comprising signaling MAC addresses of the virtual machines to the external network.

9. Logic encoded in one or more tangible media for execution and when executed operable to:
   switch data between virtual machines located in a cloud network;
   forward data to an external network;
   perform access layer switch operations for the external network; and
   create a virtual switching overlay for secure communication of said data between the virtual machines and the external network.

10. The logic of claim 9 wherein the external network is an enterprise network and the cloud network is a virtual private cloud in a service provider network.

11. The logic of claim 9 wherein the logic is further operable to encapsulate said data for transmittal over a layer 3 network.

12. The logic of claim 9 wherein said data is forwarded to the external network over a virtual private network connection between the cloud network and the external network.

13. The logic of claim 9 wherein said data is forwarded utilizing a layer 2 tunneling protocol over a secure Internet protocol.

14. The logic of claim 9 wherein the logic is further operable to signal MAC addresses of the virtual machines to the external network.

15. An apparatus comprising
   means for receiving data at a virtual switch in a cloud network, said data received from an external network and destined for one or more virtual machines located in the cloud network and associated with the external network; and
   means for transmitting said data from the virtual switch to said one or more virtual machines;
   wherein the virtual switch operates as an access layer switch for the external network and creates a virtual switching overlay for secure communication between the virtual machines and the external network.

16. The apparatus of claim 15 wherein the external network is an enterprise network and the cloud network is a virtual private cloud in a service provider network.

17. The apparatus of claim 15 wherein means for transmitting said data comprises means for encapsulating said data for transmittal over a layer 3 network.

18. The apparatus of claim 15 wherein means for transmitting said data comprises means for transmitting said data over a virtual wire to an agent installed at the virtual machine.

19. The apparatus of claim 15 wherein said data is received over a virtual private network connection between the cloud network and the external network.

20. The apparatus of claim 15 further comprising means for signaling MAC addresses of the virtual machines to the external network.

* * * * *